United States Patent
Kokkevis et al.

(10) Patent No.: US 11,514,156 B2
(45) Date of Patent: Nov. 29, 2022

(54) METHOD AND SYSTEM FOR EXECUTING APPLICATIONS USING NATIVE CODE MODULES

(71) Applicant: Google LLC, Mountain View, CA (US)

(72) Inventors: Evangelos Kokkevis, Mountain View, CA (US); Matthew Papakipos, Palo Alto, CA (US); David C. Sehr, Cupertino, CA (US)

(73) Assignee: Google LLC, Mountain View, CA (US)

(*) Notice: Subject to any disclaimer, the term of this patent is extended or adjusted under 35 U.S.C. 154(b) by 521 days.

(21) Appl. No.: 14/925,413

(22) Filed: Oct. 28, 2015

(65) Prior Publication Data

US 2016/0048677 A1 Feb. 18, 2016

Related U.S. Application Data

(63) Continuation of application No. 12/266,602, filed on Nov. 7, 2008, now Pat. No. 9,176,754.

(60) Provisional application No. 61/081,327, filed on Jul. 16, 2008.

(51) Int. Cl.
| | |
|---|---|
| *G06F 21/53* | (2013.01) |
| *G06F 9/445* | (2018.01) |
| *G06F 21/51* | (2013.01) |
| *G06F 21/57* | (2013.01) |
| *H04L 67/00* | (2022.01) |
| *H04L 67/02* | (2022.01) |

(52) U.S. Cl.
CPC .......... *G06F 21/53* (2013.01); *G06F 9/44526* (2013.01); *G06F 9/44589* (2013.01); *G06F 21/51* (2013.01); *G06F 21/572* (2013.01); *G06F 2221/034* (2013.01); *H04L 67/02* (2013.01); *H04L 67/34* (2013.01)

(58) Field of Classification Search
CPC .......... G06F 21/51; G06F 21/53; G06F 21/57; G06F 21/577; G06F 9/54
USPC .............................................. 726/22; 709/217
See application file for complete search history.

(56) References Cited

U.S. PATENT DOCUMENTS

| | | | |
|---|---|---|---|
| 5,974,549 | A | 10/1999 | Golan |
| 5,987,245 | A | 11/1999 | Gish |
| 6,128,774 | A | 10/2000 | Necula et al. |
| 6,275,938 | B1 | 8/2001 | Bond et al. |

(Continued)

FOREIGN PATENT DOCUMENTS

| | | |
|---|---|---|
| CN | 1834906 | 9/2006 |
| WO | 9910795 A1 | 3/1999 |

OTHER PUBLICATIONS

Franz et al., "Slim Binaries", Communications of the ACM, 40 No. 12, Dec. 1, 1997, pp. 87-94.

(Continued)

*Primary Examiner* — Jerry B Dennison
(74) *Attorney, Agent, or Firm* — Botos Churchill IP Law

(57) ABSTRACT

Some embodiments provide a system that executes a web application. During operation, the system loads the web application in a web browser and loads a native code module associated with the web application into a secure runtime environment. Next, the system provides input data associated with the web application to the native code module and processes the input data using the native code module to obtain output data. Finally, the system provides the output data to the web application for use by the web application.

21 Claims, 4 Drawing Sheets

(56) References Cited

U.S. PATENT DOCUMENTS

| | | | |
|---|---|---|---|
| 6,282,702 B1 | 8/2001 | Ungar | |
| 6,697,971 B1 | 2/2004 | Dwyer | |
| 6,738,469 B1* | 5/2004 | Peirce | H04M 1/27455 370/352 |
| 7,076,042 B1* | 7/2006 | Praturi | H04M 7/006 379/201.01 |
| 7,188,282 B2 | 3/2007 | Walmsley | |
| 7,257,615 B2 | 8/2007 | Eilers et al. | |
| 7,581,103 B2 | 8/2009 | Horne et al. | |
| 7,596,694 B1 | 9/2009 | Karp | |
| 7,647,589 B1 | 1/2010 | Dobrovolskiy et al. | |
| 8,151,349 B1 | 4/2012 | Yee et al. | |
| 9,058,483 B2 | 6/2015 | Chen et al. | |
| 9,361,453 B2 | 6/2016 | Chen et al. | |
| 9,710,654 B2 | 7/2017 | Chen et al. | |
| 2003/0005048 A1 | 1/2003 | Risalvato | |
| 2003/0018834 A1 | 1/2003 | Eilers et al. | |
| 2003/0126311 A1 | 7/2003 | Kushnirskiy et al. | |
| 2004/0123117 A1 | 6/2004 | Berger | |
| 2004/0158813 A1 | 8/2004 | Xia | |
| 2004/0172530 A1 | 9/2004 | Birk et al. | |
| 2004/0193679 A1 | 9/2004 | Tecco et al. | |
| 2004/0230949 A1* | 11/2004 | Talwar | G06F 9/44589 717/118 |
| 2005/0193380 A1 | 9/2005 | Vitanov | |
| 2005/0273605 A1 | 12/2005 | Saha et al. | |
| 2005/0283770 A1 | 12/2005 | Karp et al. | |
| 2006/0123279 A1 | 6/2006 | Cardinell | |
| 2006/0143689 A1 | 6/2006 | Yu et al. | |
| 2006/0174077 A1 | 8/2006 | Abadi et al. | |
| 2007/0107057 A1 | 5/2007 | Chander et al. | |
| 2007/0157298 A1* | 7/2007 | Dingwall | G06F 21/34 726/8 |
| 2007/0169110 A1 | 7/2007 | Gupta et al. | |
| 2007/0261124 A1 | 11/2007 | Centonze et al. | |
| 2007/0266373 A1 | 11/2007 | Liu | |
| 2008/0016339 A1 | 1/2008 | Shukla | |
| 2008/0047023 A1 | 2/2008 | Lam et al. | |
| 2008/0071884 A1* | 3/2008 | Heithcock | G06F 9/4425 709/219 |
| 2008/0155679 A1 | 6/2008 | Sebot et al. | |
| 2008/0163366 A1 | 7/2008 | Chinya et al. | |
| 2008/0172661 A1* | 7/2008 | Chatterjee | G06F 8/443 717/158 |
| 2008/0320436 A1* | 12/2008 | Hughes | G06F 8/20 717/100 |
| 2009/0007223 A1 | 1/2009 | Centonze et al. | |
| 2009/0210347 A1* | 8/2009 | Sarcanin | G06Q 20/02 705/67 |
| 2009/0210874 A1* | 8/2009 | Harris | G06F 9/4552 718/1 |
| 2009/0271501 A1* | 10/2009 | Shenfield | G06F 8/60 709/219 |
| 2009/0282474 A1* | 11/2009 | Chen | G06F 21/53 726/21 |
| 2009/0282477 A1* | 11/2009 | Chen | G06F 21/577 726/22 |
| 2010/0013842 A1 | 1/2010 | Green et al. | |
| 2014/0026214 A1* | 1/2014 | Adams | G06F 21/54 726/22 |
| 2017/0262657 A1* | 9/2017 | Salmon-Legagneur | G06F 11/1004 |

OTHER PUBLICATIONS

Liang, "The Java™ Native Interface Programmer's Guide and Specification", Jan. 1, 1999, 318 pages, Part 1, 145 pages.
Liang, "The Java™ Native Interface Programmer's Guide and Specification", Jan. 1, 1999, 318 pages, Part 2, 173 pages.
Office Action issued in Canadian Application No. 2,730,128 dated Apr. 11, 2016, 12 pages.
Excelsior LLC, Excelsior JET for Microsoft Windows version 6.0 User's Guide, 2007, http://www.excelsior-usa.com/download/jet60x/jet-600-doc-win32-pdg.zip, See pp. 5-6, and 99-105.
Erlingsson et al. *XFI: Software Guards for System Address Spaces.* OSDI '06: 7th USENIX Symposium on Operation Systems Design and Implementation. USENIX Association. Seattle, WA, Nov. 2006. pp. 75-88.
Schafter, Andreas. Extended European Search Report dated Jul. 3, 2012 for European Application No. 09798562.6, filed Jul. 6, 2009. 7 pages.
Goldberg, Ian et al. A Secure Environment for Untrusted Helper Applications, Jul. 22, 1996, Retrieved from the internet: http://www.cs.berkeley.edu/daw/papers/janus-usenix96.ps. Retrieved Apr. 19, 2006. 13 pages.
Holzammer, Andreas. Security Issues about Web Browser Add-ons, Jun. 6, 2008, Retrieved from the internet: https://www.net.t-labs.tu-berlin.de/teaching/ss08/IS_seminar/PDF/A.1.pdf. Retrieved Jun. 19, 2012. 10 pages.
Silberschatz, Abraham, et al. *Interprocess Communication.* Dec. 14, 2004. Operating System Concepts, John Wiley & Sons. Retrieved from the internet: http://proquest.safaribooksonline.com/print?xmlid=9780471694663/int.html . Retrieved Jun. 20, 2012. 8 pages.
Authorized Officer Nora Lindner, International Preliminary Report on Patentability dated Jan. 27, 2011 for International Application No. PCT/US2009/049679, filed Jul. 6, 2009. 6 Pages.
Authorized Officer Ji Myong Nho, International Search Report and Written Opinion dated Jan. 26, 2010 for International Application No. PCT/US2009/049679, filed Jul. 6, 2009. 8 Pages.
Wang, Maohua. Translation of the Notification of the first Office Action dated Aug. 22, 2012 for Chinese Patent Application No. 200980127703.8. 7 pages.
Stephen, Mark. First Office Action for Canadian Patent Application No. 2,730,128, filed Jul. 6, 2009, dated Apr. 5, 2013. 4 pages.
Office Action issued in U.S. Appl. No. 12/266,602 dated Jun. 25, 2010, 36 pages.
Office Action issued in U.S. Appl. No. 12/266,602 dated Dec. 2, 2010, 37 pages.
Office Action issued in U.S. Appl. No. 12/266,602 dated Mar. 28, 2012, 36 pages.
Office Action issued in U.S. Appl. No. 12/266,602 dated Aug. 17, 2012, 40 pages.
Office Action issued in U.S. Appl. No. 12/266,602 dated Nov. 24, 2014, 54 pages.
Australian Office Action issued in Australian Application No. 2009271181 dated Jan. 15, 2014, 3 pages.
Chinese Office Action issued in Chinese Application No. 200980127703.8 dated Jan. 13, 2014, 21 pages (with English translation).
Chinese Office Action issued in Chinese Application No. 200980127703.8 dated Jan. 20, 2015, 17 pages (with English translation).
Canadian Office Action issued in Canadian Application No. 2,730,128 dated Apr. 30, 2014, 5 pages.
Office Action issued in U.S. Appl. No. 12/266,602 dated Apr. 15, 2015, 51 pages.
Canadian Office Action issued in Canadian Application No. 2,730,128 dated Apr. 7, 2015, 8 pages.
Wikipedia, "Fat Binary," Last modified May 25, 2015, [retrieved on May 26, 2015], Retrieved from the Internet < http://en.wikipedia.org/wiki/Fat_binary>, 5 pages.
Notice of Allowance issued in U.S. Appl. No. 12/266,602 dated Jul. 2, 2015, 13 pages.
Office Action issued in Korean Application No. 10-2011-7000770 dated Sep. 18, 2015, 9 pages (with English translation).
Office Action issued in European Application No. 09798562.6, dated Jan. 25, 2018, 12 pages.
Small et al. "MiSFIT: A tool for constructing safe extensible C++ systems," Conference on Object Oriented Technologies and Systems, Jun. 16, 1997, 9 pages.
Office Action issued in Chinese Application No. 201510689339.1, dated Aug. 14, 2017, 15 pages (English Translation).
Office Action issued in Chinese Application No. 201510689339.1, dated Apr. 23, 2018, 7 pages (with English translation).

(56) References Cited

OTHER PUBLICATIONS

"ARM Discloses Technical Details of the Next Version of the ARM Architecture" (Press release) ARM Holdings. Oct. 27, 2011.
"Foundational proof-carrying code"; Andrew W. Appel; 10 pages, 16th Annual IEEE Symposium on Logic in computer science; 2001.
"Proof-carrying code, design and implementation", Necula et al; School of computer science; UC Berkeley; p. 261-288 2002; 28 pages.
Apap, F. et al., "Detecting Malicious Software by Monitoring Anomalous Windows Registry Access", Recent advances in intrusion detection, Springer, 2002, DD. 36-53.
B. Ford, VXA: A virtual architecture for durable compressed archives. In USENIX File and Storage Technologies, Dec. 2005.
European Search Report issued in European Application No. 09743550.7 dated Feb. 7, 2014, 8 pages.
Extended European Search Report for European Patent Application No. EP 18179497.5, dated Sep. 25, 2018. 9 pages.
G. Necula, Proof carrying code. In Principles of Programming Languages, pp. 1-14, 1997.
International Search Report and Written Opinion in International Application No. PCT/US2009/042962, dated Dec. 30, 2009, 7 pages.
International Search Report and Written Opinion in International Application No. PCT/US2009/042965, dated Jul. 30, 2009, 12 pages.
Klinkoff et al. Extending . NET security to unmanaged code Jul. 17, 2007 Springer-Verlag (Year: 2007).
Necula et al. "Proof-carrying code," School of computer science, Carnegie Mello University, Nov. 1996, 62 pages.
Robert Wahbe, Steven Lucco, Thomas E. Anderson, and Susan L. Graham, Efficient software-based fault isolation, ACM SIGOPS Operating Systems Review, 27(5): 203-216, Dec. 1993.
S. McCamant and G. Morrisett, Evaluating SFI for a CISC architecture. In 15th USENIX Security Symposium, pp. 1-16, Aug. 2006.
U. Erlingsson, M. Abadi, M. Veable, M. Budiu, and G. Necula, XFI: Software guards for system address spaces. In OSDI '06: 7th Symposium on Operating Systems Design and Implementation, pp. 75-88, Nov. 2006.
V. Prasad, W. Cohen, FC Eigler, M. Hunt, J. Keniston, and JB Chen, Locating system problems using dynamic instrumentation, In 2005 Ottawa Linux Symposium, pp. 49-64, Jul. 2005.
Weber, M. et al., "A toolkit for detecting and analyzing malicious software", Proceedings on 18th Annual Computer Security Applications Conference, Dec. 9-13, 2002, pp. 423-431.
Office Action for European Patent Application No. 09798562.6, dated Nov. 22, 2018. 8 pages.

* cited by examiner

METHOD AND SYSTEM FOR EXECUTING APPLICATIONS USING NATIVE CODE MODULES

RELATED APPLICATION

This application is a continuation of U.S. application Ser. No. 12/266,602, filed Nov. 7, 2008, which claims the benefit of U.S. Provisional Application No. 61/081,327, filed on Jul. 16, 2008. The contents of each of which are incorporated by reference.

The subject matter of this application is also related to the subject matter in a co-pending non-provisional application by J. Bradley Chen, Matthew T. Harren, Matthew Papakipos, David C. Sehr, and Bennet S. Yee, entitled, "Method for Validating an Untrusted Native Code Module," having Ser. No. 12/117,634, and filing date 8 May 2008.

The subject matter of this application is also related to the subject matter in a co-pending non-provisional application by J. Bradley Chen, Matthew T. Harren, Matthew Papakipos, David C. Sehr, Bennet S. Yee, and Gregory Dardyk entitled, "Method for Safely Executing an Untrusted Native Code Module on a Computing Device," having Ser. No. 12/117,650, and filing date 8 May 2008.

BACKGROUND

1. Field

The present embodiments relate to techniques for executing applications on computer systems. More specifically, the present embodiments relate to a method and system for executing web applications using native code modules.

2. Related Art

Computer systems may include a number of native applications that require significant processing resources to execute. Such applications may perform tasks such as image processing, audio and video decoding and mixing, mathematical modeling, and/or simulation. To run efficiently, these applications are often written in a combination of general purpose programming languages such as C or C++ and low-level languages such as assembly language. Consequently, the applications may be restricted to specific platforms, involve a lengthy installation process, and may pose a security risk to the computer systems on which the applications are installed.

On the other hand, web applications, which have become more prevalent in recent years, are typically written in scripting languages that are more secure and require no installation. However, web applications may lack the performance capabilities of native applications. In particular, a web application may run one or two orders of magnitude slower or more than a native application. As a result, web applications are currently unable to implement computationally intensive features that are available in native applications.

SUMMARY

Some embodiments provide a system that executes a web application. During operation, the system loads the web application in a web browser and loads a native code module associated with the web application into a secure runtime environment. Next, the system provides input data associated with the web application to the native code module and processes the input data using the native code module to obtain output data. Finally, the system provides the output data to the web application for use by the web application.

In some embodiments, the system also validates the native code module prior to loading the native code module into the secure runtime environment.

In some embodiments, the output data is provided to a trusted plugin associated with the web browser for use by the trusted plugin.

In some embodiments, the output data is used by the trusted plugin to render graphics for the web application.

In some embodiments, the native code module provides at least one of simulation, signal processing, artificial intelligence, modeling, and analysis for the web application.

In some embodiments, the secure runtime environment is implemented by a plugin associated with the web browser.

In some embodiments, the web application and the native code module are platform independent.

In some embodiments, the input data is provided to the native code module using a first inter-module communication (IMC) buffer, and the output data is provided to the web application using a second IMC buffer.

In some embodiments, processing the input data involves performing a series of mathematical calculations using the input data.

DETAILED DESCRIPTION

Figure 1:
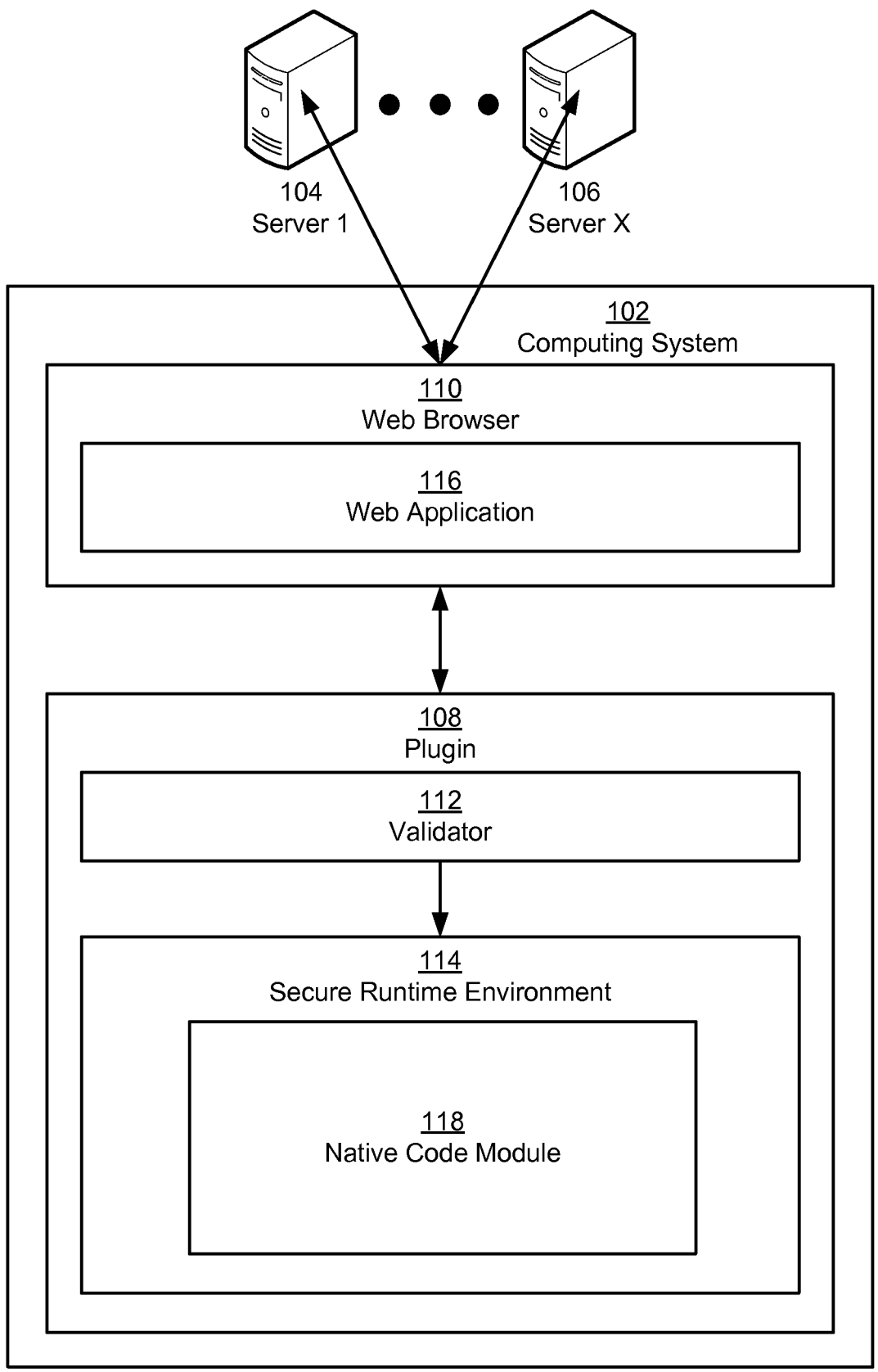
FIG. 1 shows a schematic of an embodiment of a system.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments of the system provide a method and system for executing a web application. The web application may be loaded in a web browser and executed on a computing system such as a personal computer (PC), a mobile phone, a personal digital assistant (PDA), a graphing calculator, a portable media player, a global positioning system (GPS) receiver, and/or another electronic computing device. The web application may be obtained by the computing system from a server using a network connection with the server. For example, the web application may be downloaded over the Internet from a website.

More specifically, embodiments of the technique provide a method and system for executing the web application using a native code module. The native code module may contain native code that is executed within a secure runtime environment. In addition, the native code module may be used to process data for the web application to provide functionality associated with computationally intensive tasks such as simulation, signal processing, artificial intelligence, and/or modeling. As a result, embodiments of the system may provide a framework for combining the portability and security of web applications with the native performance of binary code.

FIG. 1 shows a schematic of a system. The system includes a computing system 102 and a set of servers (e.g., server 1 104, server x 106). Computing system 102 includes a web application 116 running within a web browser 110 and a plugin 108. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., processor, memory, I/O components, wireless transmitter, etc.) on computing system 102 from the operating system, as well as interact with the user through a hardware and/or software framework provided by the operating system, as described below.

Those skilled in the art will appreciate that computing system 102 may include functionality to execute both native applications and non-native applications. In other words, computing system 102 may include native applications, such as web browser 110, that are locally installed on computing system 102 and specific to the operating system and/or one or more hardware devices on computing system 102. Such applications may be compiled into native (e.g., machine) code that executes directly on one or more central processing units (CPUs) of computing system 102. Code execution in the applications may further be optimized by writing the applications in a combination of general-purpose programming languages (e.g., C, C++, etc.) and assembly language, as well as utilizing libraries that provide hardware acceleration (e.g., graphics hardware acceleration) to the applications. However, the installation of native applications may compromise computing system 102 and private data stored on computing system 102.

Computing system 102 may also include functionality to execute platform independent, non-native applications. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the type of platform (e.g., operating system, drivers, etc.) associated with computing system 102. Though platform independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as Javascript (Javascript™ is a registered trademark of Sun Microsystems, Inc.). The interpretive nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

In particular, web application 116 may be unable to provide computationally intensive features that are available in native applications. These features may include, but are not limited to:
  Simulation: computational fluid dynamics (CFD), rigid body dynamics, collision detection, molecular dynamics, three-dimensional (3D) animation, etc.
  Signal Processing: audio encoding and decoding, video encoding and decoding, image processing, speech signal processing, etc.
  Artificial Intelligence (AI): data mining, machine learning, game AIs, pattern recognition, etc.
  Modeling: financial modeling, mathematical modeling, scientific modeling, 3D modeling, etc.
  Analysis: numerical analysis, financial analysis, engineering analysis, cryptanalysis, statistical data analysis, etc.
In a broad sense, web application 116 may be unable to efficiently implement features that require the execution of complex mathematical operations, such as floating point operations. For example, web application 116 may execute too slowly to perform fast Fourier transforms (FFTs), Monte Carlo methods, matrix operations, conjugate gradient methods, and/or regression techniques on input data of a substantial size.

To provide computationally intensive features to the user, a native code module 118 associated with web application 116 may be used to execute computationally intensive code on behalf of web application 116. Like web application 116, native code module 118 may be obtained from one or more servers (e.g., server 1 104, server x 106) by web browser 110. For example, web application 116 may provide a hyperlink to native code module 118 on the Internet. Web browser 110 may then download native code module 118 from the Uniform Resource Locator (URL) specified in the hyperlink. Alternatively, native code module 118 may be specified by the user or by an external source, such as another web application and/or a native application.

More specifically, native code module 118 may correspond to a software module containing native code that runs directly on hardware provided by computing system 102, such as a CPU. As a result, native code module 118 may be used to perform tasks that require substantial access to CPU resources on computing system 102. In particular, native code module 118 may provide one or more of the computationally intensive features listed above to a user of web application 116 by processing input data associated with web application 116. The input data may be processed by performing a series of mathematical calculations using the input data, such as the mathematical operations described above.

Output data obtained from the processed input data may be provided to web application 116 for use by web application 116. For example, the output data may be provided to the user by web application 116 or used by web application 116 to perform additional tasks for the user. The output data may also be provided as input data to other components associated with web application 116, such as a native application, a trusted plugin, and/or one or more servers (e.g., server 1 104, server x 106).

For example, web application 116 may provide audio or video encoding and/or decoding capabilities to the user of computing system 102. First, the user may specify an audio or video file to decode and/or an audio or video stream to encode. Next, web application 116 may obtain a native code module (e.g., native code module 118) containing a codec for the file or stream from a server (e.g., server 1 104, server x 106). The native code module may then execute on a CPU of computing system 102 to provide the codec's encoding and/or decoding capabilities to the user.

Similarly, web application 116 and native code module 118 may be used by computing system 102 to perform computationally intensive operations for a distributed computing cluster. More specifically, native code module 118 may be obtained by web application 116 and executed by plugin 108 to create a node in the distributed computing cluster on computing system 102. The computationally intensive operations may be performed by native code module 118 during periods of CPU underutilization on computing system 102. Output from native code module 118 may be sent to a server (e.g., server 1 104, server x 106) to aid in the analysis of complex problems such as protein folding, unsolved mathematics problems, detection of gravitational waves, and/or stock forecasting.

In one or more embodiments, plugin 108 includes a variety of mechanisms to ensure the safe execution of native code module 118. In particular, native code module 118 may be validated by a validator 112 provided by plugin 108 prior to execution. Native code module validation is described in a co-pending non-provisional application by inventors J. Bradley Chen, Matthew T. Harren, Matthew Papakipos, David C. Sehr, and Bennet S. Yee, and filed on the same day as the instant application entitled, "Method for Validating an Untrusted Native Code Module," having Ser. No. 12/117,634, and filing date 8 May 2008, which is incorporated herein by reference.

Once native code module 118 is validated, native code module 118 may be loaded into a secure runtime environment 114 provided by plugin 108. Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk and filed on the same day as the instant application, entitled, "Method for Safely Executing an Untrusted Native Code Module on a Computing Device," having Ser. No. 12/117,650, and filing date 8 May 2008, which is incorporated herein by reference.

While isolating native code modules from all other software and hardware components preserves security, software modules typically do not execute in isolation, and need to communicate results to a client application and/or access system resources. Embodiments of the present invention enable limited communication between the native code module and other system components using a secure runtime environment.

In one embodiment of the present invention, the secure runtime environment:
provides the ability to load and launch native code modules;
provides an execution environment for native client modules that includes communications, threads, memory management, and debugging support;
moderates access to system resources using a simple access policy that ensures that native code modules do not violate system protection and privacy constraints;
supports multiple native code modules isolated from each other; and
can be implemented in a small amount of code that can be both easily audited as well as ported to multiple operating systems that run on the same hardware architecture.

The secure runtime environment moderates both which resources can be accessed (and communicated with) by the native code module, as well as how such resources are accessed, thereby ensuring that the native code module relies entirely on the secure runtime environment to access system services and cannot perform sensitive operations without explicit mediation. For instance, a native code module cannot read or change file system state, initiate network (or inter module and/or inter-process) communications, or launch computations outside of an isolated "sandbox," and instead must rely on the secure runtime environment to perform such interactions (if allowed) on its behalf.

One embodiment of the present invention provides a system that safely executes a native code module on a computing device. During operation, the system receives the native code module, which is comprised of untrusted native program code expressed using native instructions in the instruction set architecture associated with the computing device. The system then loads the native code module into a secure runtime environment, and proceeds to execute a set of instructions from the native code module in the secure runtime environment. The secure runtime environment enforces code integrity, control-flow integrity, and data integrity for the native code module. Furthermore, the secure runtime environment moderates which resources can be accessed by the native code module on the computing device and/or how these resources can be accessed. By executing the native code module in the secure runtime environment, the system facilitates achieving native code performance for untrusted program code without a significant risk of unwanted side effects.

In some embodiments, the system enforces data integrity by using sandboxing techniques that manage and/or limit the memory segments that the native code module can access, thereby ensuring that the untrusted program code in the native code module cannot perform unauthorized data reads or writes. In some embodiments, these techniques leverage hardware support for segmented memory to enforce data integrity.

In one embodiment of the present invention, creating a system-compliant native code module involves following a set of restrictions and/or policies that preserve the integrity and security of code, control flow, and data. Preserving code integrity involves ensuring that only "safe" instructions can be executed by the native code module, and that no unsafe instructions can be inserted at runtime via dynamic code generation or self-modifying code. Restricting the instruction set which is available to the native code module also can help to make decoding the native code module (during validation) more reliable. Preserving control flow integrity involves ensuring that control flow instructions in the native code module cannot violate security by calling instructions outside of the native code module. Preserving data integrity involves ensuring that a native code module cannot perform "wild reads" or "wild writes" (e.g., reads or writes outside of a specified data region associated with the native code module).

In one embodiment of the present invention, the validator helps to achieve code, control-flow, and data integrity for an x86 native code module in part by ensuring that a set of "unsafe" instructions from the x86 ISA (instruction set architecture) are not included in a native code module. For instance, the validator may disallow the use of the following instructions and/or features in a native code module:

- the syscall (system call) and int (interrupt) instructions, which attempt to directly invoke the operating system;
- all instructions that modify x86 segment state (including LDS, far calls, etc), because these instructions interfere with the memory segments that are used to enforce data integrity (see the segmented memory description below);
- the rdtsc (read time stamp counter) and rdmsr (read from model specific register) instructions, as well as other hardware performance instructions and/or features which may be used by a native code module to mount side-channel attacks (e.g., by covertly leaking sensitive information);
- various complex addressing modes that complicate the verification of control flow integrity;
- the ret (return) instruction, which determines a return address from a stack location, and is replaced with a sequence of instructions that use a register-specified destination instead (and hence is not vulnerable to a race condition that allows the stack location to be used as a destination by a first thread to be overwritten maliciously (or erroneously) by a second thread just prior to the execution of the return instruction); and
- some aspects of exception and signal functionality—for instance, while the system may support C++ exceptions (as defined in the C++ language specification), the system may not support hardware exceptions (such as divide-by-zero or invalid memory reference exceptions) due to operating system limitations, and may terminate execution of an untrusted native code module when faced with such a hardware exception.

Furthermore, to provide effective code discovery and control integrity, the system also restricts a set of control transfer instructions. Specifically, unmodified indirect control flow instructions that can transfer execution to arbitrary locations in memory need to be modified to guarantee that all indirect control flow targets are in memory regions that are valid for the native code module. One embodiment of the present invention limits indirect control flow instructions by: (1) not allowing return, far call, and far jump instructions; (2) ensuring that call and jump (jmp) instructions only use relative addressing and are encoded in a sequence of instructions such that the control flow remains within the native code module; (3) ensuring that register indirect call and jump instructions are encoded in a sequence of instructions such that the control flow remains within the native code module and targets valid instruction addresses within the module; and (4) not allowing other indirect calls and jumps.

Furthermore, because native code module 118 may include binary code that runs directly on hardware, native code module 118 may be platform independent with respect to the operating system of computing system 102, web browser 110, and/or other software components on computing system 102. As described in the above-referenced applications, plugin 108 and/or native code module 118 may also include mechanisms for executing on a variety of instruction set architectures, including the use of "fat binaries" and binary translators.

Figure 2:
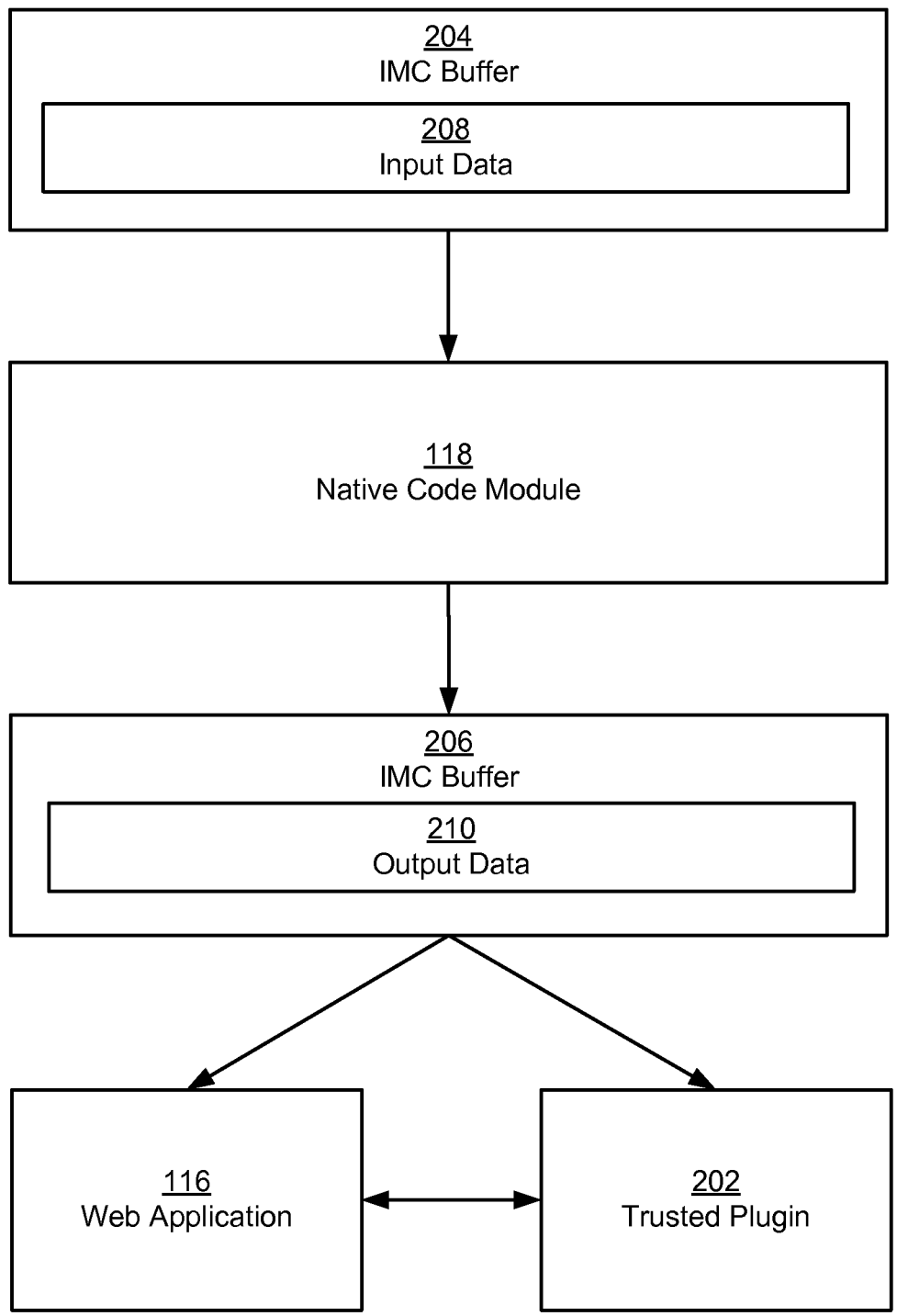
FIG. 2 shows the use of inter-module communication (IMC) buffers by a native code module in accordance with an embodiment of the system.

FIG. 2 shows the use of inter-module communication (IMC) buffers by a native code module. In particular, FIG. 2 shows the flow of data through native code module 118. As shown in FIG. 2, input data 208 is obtained by native code module 118 from a first inter-module communication (IMC) buffer 204. As described above, input data 208 may be specified by web application 116, a user, and/or a native application. Input data 208 may also be obtained from a variety of sources for placement in IMC buffer 204, including a host on a network, a disk, an input device (e.g., camera, microphone, etc.), and/or a hardware device (e.g., sound card, video card, etc.).

Native code module 118 may process input data 208 to obtain output data 210, which is placed into a second IMC buffer 206. More specifically, native code module 118 may obtain output data 210 by performing a series of mathematical calculations using input data 208. For example, native code module 202 may perform a series of matrix operations, mathematical transforms and/or inverse transforms, and/or other floating point operations using input data 208. Output data 210 may then be obtained from IMC buffer 206 for use by web application 116 and/or a trusted plugin 202 associated with web application 116. In particular, web application 116 and/or trusted plugin 202 may use output data 210 to perform additional tasks for a user of web application 116 or an entity associated with web application 116. For example, output data 210 may be stored in a file that is provided to the user, plotted in a chart or graph, uploaded to a database for a distributed computing cluster, and/or used to modify the execution of other applications. Output data 210 may also be used to animate a 3D graphics model, as discussed below with respect to FIG. 3.

In one or more embodiments, IMC buffers 204-206 correspond to shared memory buffers that are used to facilitate data-intensive collaboration between native code module 118 and external components such as web application 116 and/or trusted plugin 202. Furthermore, sharing of data via IMC buffers 204-204 may be managed by an IMC runtime, as described in the above-referenced applications.

Figure 3:
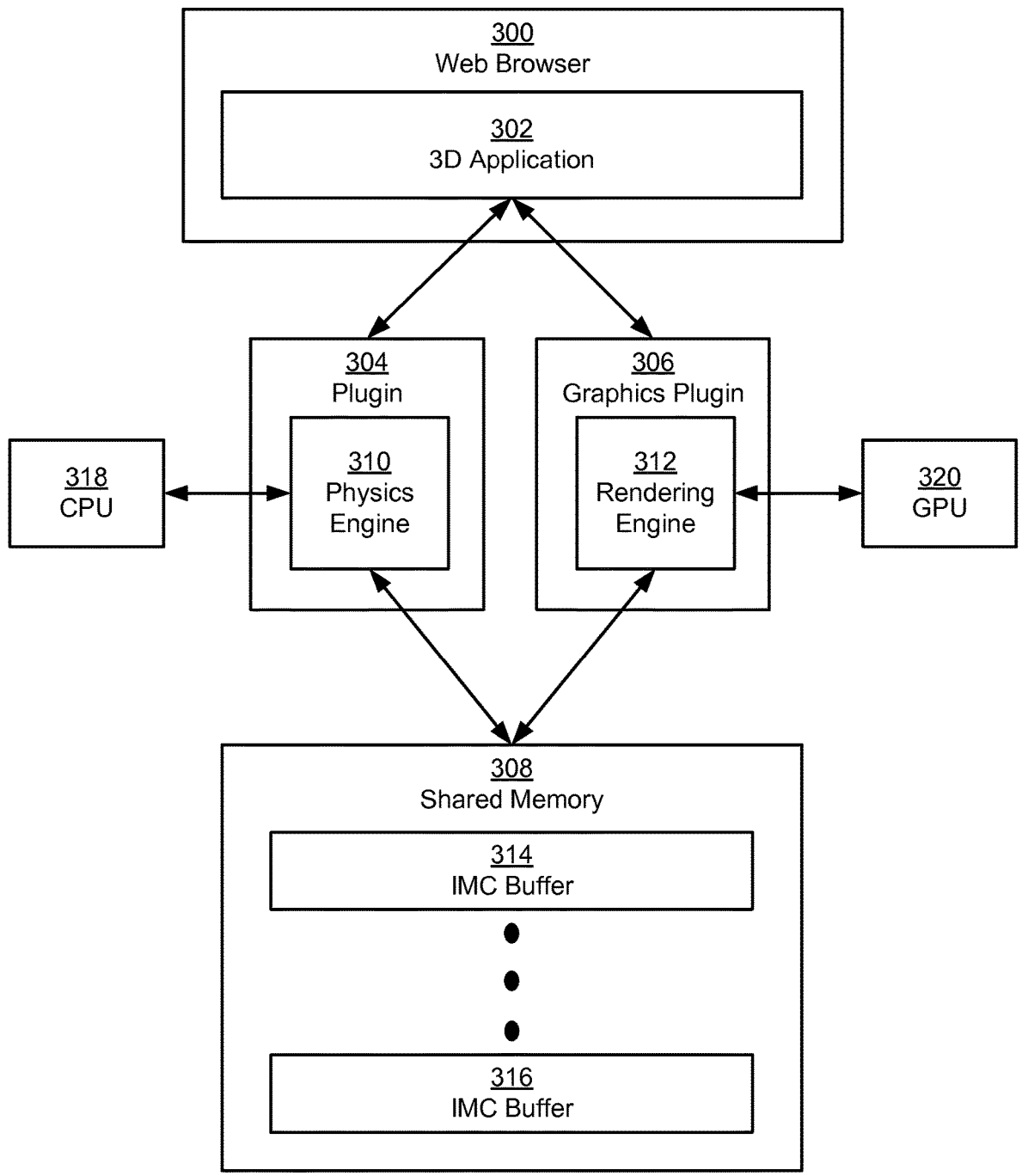
FIG. 3 shows a system for rendering graphics for a web application.

FIG. 3 shows a system for executing a web-based 3D application 302. 3D application 302 may correspond to a web application that executes in a web browser 300. In addition, 3D application 302 may provide 3D graphics rendering and animation capabilities to a user of 3D application. For example, 3D application 302 may be a 3D computer game, CAD system, and/or a scientific modeling and/or simulation application. Furthermore, 3D application 302 may be written in a web-based scripting language such as Javascript. As a result, 3D application 302 may be unable to meet the demands of real-time 3D graphics rendering and animation. Instead, 3D application 302 may offload graphics rendering to a graphics plugin 306 and animation to a plugin 304.

As shown in FIG. 3, plugin 304 includes a physics engine 310 that executes on a CPU 318. In one or more embodiments, physics engine 310 corresponds to a native code module that is executed within a secure runtime environment provided by plugin 304. Physics engine 310 may be provided by 3D application 302 (e.g., downloaded over the Internet) and validated prior to execution in plugin 304. Moreover, physics engine 310 may include native code that executes directly on CPU 318 within the constraints set by the secure runtime environment. The execution of physics engine 310 on CPU 318 may thus provide 3D application 302 with real-time animation of objects within 3D application 302.

Similarly, graphics plugin 304 includes a rendering engine 312 that communicates with a graphics-processing unit (GPU) 320. In one or more embodiments, graphics plugin 304 corresponds to a trusted plugin, such as trusted plugin 202 of FIG. 2. In other words, graphics plugin 306 may be downloaded from a trusted source by web browser 300 and installed by web browser 300 to render graphics for 3D application 302. Furthermore, rendering engine 312 may provide graphics hardware acceleration by performing calculations related to graphics rendering using GPU 320. Graphics plugin 306 and rendering engine 312 are described in a co-pending non-provisional application by inventors Vangelis Kokkevis, Matthew Papakipos, and Robin Green and filed on the same day as the instant application entitled, "WEB-BASED GRAPHICS RENDERING SYSTEM," having Ser. No. 12/174,586, and filing date Jul. 16, 2008.

In one or more embodiments, 3D application 302 coordinates the joint execution of physics engine 310 and rendering engine 312. More specifically, 3D application 302 may make method calls to both plugin 304 and graphics plugin 306 for loading a graphics model into rendering engine 312 and a corresponding physics model into physics engine 310. 3D application 302 may also facilitate the passing of data between plugin 304 and graphics plugin 306 using shared memory 308, as described below. On the other hand, plugin 304 and graphics plugin 306 may interface directly with one another to synchronize the animation and rendering of the graphics model.

In particular, 3D application 302 may provide an input file that describes a graphics model to graphics plugin 306. Alternatively, 3D application 302 may make a set of method calls that describe the graphics model to graphics plugin 306. The graphics model may then be loaded into the internal memory of graphics plugin 306. Next, 3D application 302 may request the allocation of one or more IMC buffers 314-316 in a region of shared memory 308 by an IMC runtime provided by plugin 304 and/or graphics plugin 306. Graphics plugin 306 may then load data relevant to physics simulation into IMC buffers 314-316. For example, graphics plugin 306 may copy vertex positions, normals, triangle indices, and/or transformation matrices into IMC buffers 314-316.

To animate the graphics model, physics engine 310 may read from IMC buffers 314-316 to create a physics model corresponding to the graphics model in graphics plugin 306. Additional information related to the physics model, such as parameters, may be obtained from 3D application 302 by plugin 304. Next, physics engine 310 may perform a series of physics simulation calculations that update the physics model. For example, physics engine 310 may calculate vertex positions and velocities based on a set of forces acting on objects in the physics model. Plugin 304 may then update IMC buffers 314-316 with new vertex positions, velocities, and/or other data. Finally, the new data is read from IMC buffers 314-316 by graphics plugin 306 and used to update the graphics model. Rendering engine 312 may then pass the updated graphics model to GPU 320 for rendering.

Graphics rendering and animation may continue to be provided by rendering engine 312 and physics engine 310 during execution of 3D application 302. For example, physics engine 310 may continue to update the graphics model as long as forces are felt by objects in the graphics model. Additional objects and/or forces may also be introduced into the graphics model and/or physics model by 3D application 302. Similarly, rendering engine 312 may render the graphics model at a frame rate specified by 3D application 302 and/or supported by GPU 320. As a result, physics engine 310 and rendering engine 312 may run at different frequencies. For example, physics engine 310 may run four times faster than rendering engine 312. As a result, the graphics model may be rendered once by rendering engine 312 for every four updates to the graphics model made by physics engine 310.

Figure 4:
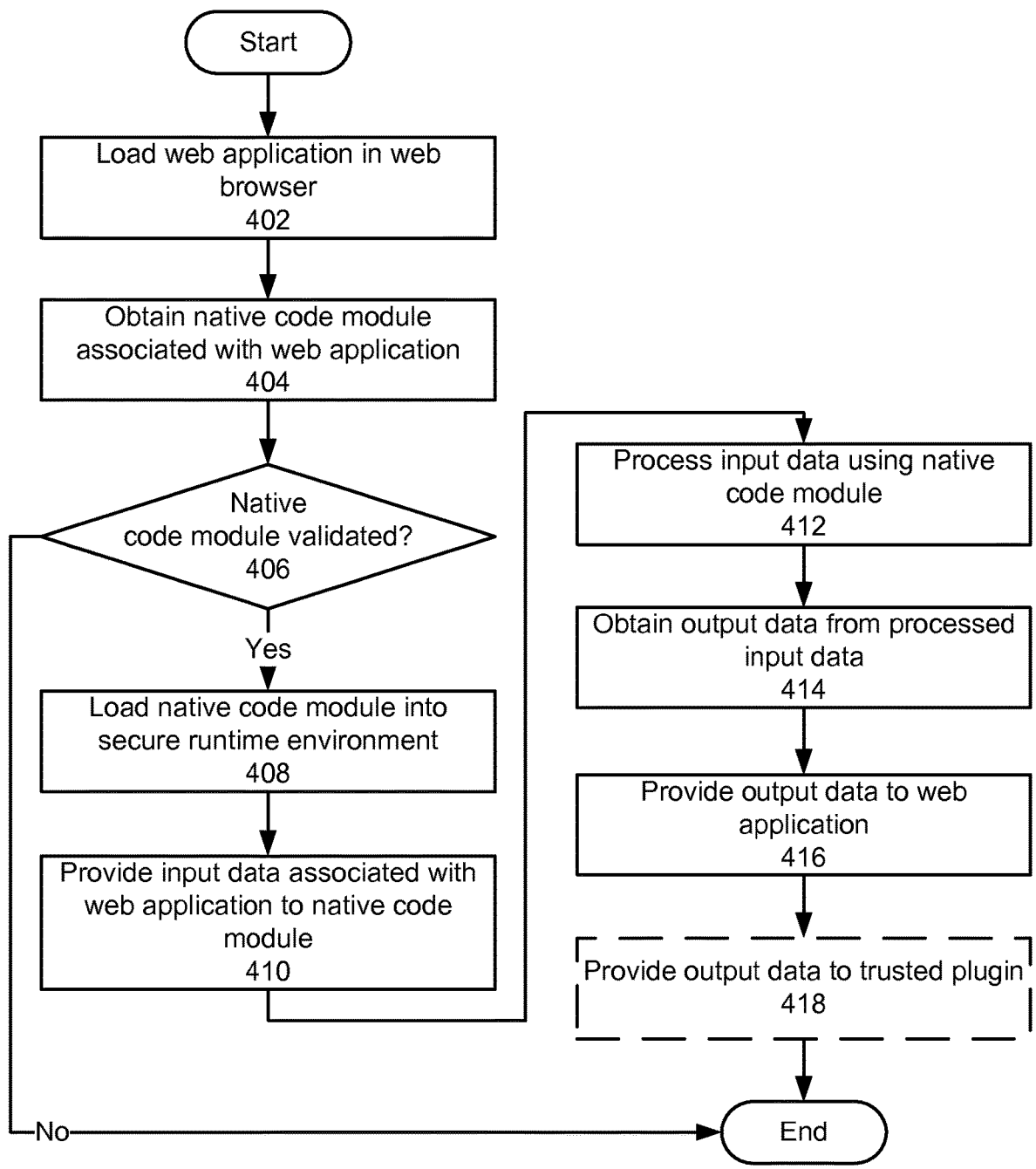
FIG. 4 shows a flowchart illustrating the process of executing a web application.

FIG. 4 shows a flowchart illustrating the process of executing a web application. In one or more embodiments, one or more of the steps may be omitted, repeated, and/or performed in a different order. Accordingly, the specific arrangement of steps shown in FIG. 4 should not be construed as limiting the scope of the technique.

Initially, a web application is loaded into a web browser (operation 402). The web application may be obtained from a server by the web browser. Furthermore, the web application may be used to provide computationally intensive features, such as financial modeling, computational math or science, and/or AI, to a user. To implement such features in a practical manner, a native code module associated with the web application may be obtained (operation 404). For example, the native code module may be downloaded from a source specified by the web application. The native code module may also be validated (operation 406) prior to executing the native code module. If the native code module is not validated, the native code module is not executed and discarded.

If the native code module is validated, the native code module is loaded into a secure runtime environment (operation 408). The secure runtime environment may be provided by a plugin associated with the web browser. Next, input data associated with the web application is provided to the native code module (operation 410). The input data may be provided to the native code module using an IMC buffer.

The input data is then processed by the native code module (operation 412) to obtain output data (operation 414). The output data is then provided to the web application (operation 416) for use by the web application. As with the input data, the output data may be provided to the web application using an IMC buffer. For example, the application may use the output data for simulation, signal processing, artificial intelligence, modeling, and/or analysis. In addition, the output data may optionally be provided to a trusted plugin (operation 418) associated with the web application for use by the trusted plugin. For example, the output data may be used by the trusted plugin to render graphics for the web application.

The foregoing descriptions of embodiments of the system have been presented only for purposes of illustration and description. They are not intended to be exhaustive or to limit the system to the forms disclosed. Accordingly, many modifications and variations will be apparent to practitioners skilled in the art. Additionally, the above disclosure is not intended to limit the system. The scope of the present system is defined by the appended claims.

What is claimed is:

1. A method comprising:
   receiving, by a computing system and from a remote system, a native code module for an application;
   loading the application on software on the computing system;
   validating, by the computing system, the native code module as being safe to be loaded and executed within a secure runtime environment of the computing system;
   moderating, by the secure runtime environment, which system resources of the computing system can be accessed by the native code module and how the system resources are accessed; and
   while executing the native code module within the secure runtime environment:
   (a) providing input data associated with the application to the native code module by retrieving, by the secure runtime environment on behalf of the native code module, the input data from a first buffer;
   (b) processing, by the native code module, the input data to obtain output data based on a result of performing a series of mathematical calculations using the input data; and
   (c) providing, to one or more external components including at least one of a web application or a trusted plugin associated with the web application, the output data using a second buffer different from the first buffer to perform tasks in the web application.

2. The method of claim 1, wherein executing the native code module in the secure runtime environment comprises executing a native code module that is platform independent with respect to an operating system of the computing system.

3. The method of claim 1, wherein loading the application on software on the computing system comprises loading a web application in a web browser on the computing system.

4. The method of claim 1, wherein providing the output data to the application for use by the application comprises:
   providing, to a trusted plugin associated with a second application, the output data for use by the trusted plugin; and
   processing, by the trusted plugin, the output data to render graphics for the application.

5. The method of claim 1, wherein loading the native code module associated with the application into the secure runtime environment comprises loading the native code module into a secure runtime environment provided by a plugin associated with a second application, the method comprising enforcing, by the secure runtime environment, code integrity, control-flow integrity, and data integrity for the native code module while executing the native code module in the secure runtime environment.

6. The method of claim 1, wherein:
   validating the native code module comprises validating a native code module that comprises binary code that runs directly on hardware in the computing system; and
   executing the native code module in the secure runtime environment comprises executing the binary code in the secure runtime environment.

7. The method of claim 6, wherein executing the binary code in the secure runtime environment comprises utilizing, by the binary code in the native code module, low-level libraries and application programming interfaces (API) available for use by native code modules in the computing system.

8. The method of claim 1, wherein validating the native code module comprises validating a native code module that is executable in a plurality of instruction set architectures.

9. The method of claim 1, wherein validating the native code module comprises validating a native code module that comprises corresponding mechanisms for executing the native code module in each of a plurality of instruction set architectures.

10. The method of claim 9, wherein validating the native code module that comprises corresponding mechanisms for executing the native code module in each of the plurality of instruction set architectures comprises validating a native code module that comprises at least one of fat binaries or binary translators.

11. A system comprising:
    one or more processing units of a computing system configured to:
       receive a native code module associated with an application from a remote system;
       load the native code module in a secure runtime environment of the computing system;
       execute the native code module in the secure runtime environment;
       validate, using a validator of the computing system, the native code module as being safe to be loaded and executed within the secure runtime environment of the computing system; and
       moderate, using the secure runtime environment, which system resources of the computing system can be accessed by the native code module and how the system resources are accessed;
    a first buffer; and
    a second buffer different from the first buffer;
    wherein while executing the native code module in the secure runtime environment, the one or more processing units are configured to:
       (a) provide input data associated with the application to the native code module by retrieving, by the secure runtime environment on behalf of the native code module, the input data from the first buffer;
       (b) process the input data based on a result of performing a series of mathematical calculations using the input data to obtain output data; and
       (c) provide the output data to the application via the second buffer for use by the application.

12. The system of claim 11, wherein:
    the native code module is platform independent with respect to an operating system of the computing system; and the secure runtime environment is configured to execute the native code module that is platform independent with respect to the operating system of the computing system.

13. The system of claim 11, wherein:
the one or more processing units is further configured to execute a web browser, installed on the computing system, to load an application before loading and executing the native code module in the secure runtime environment.

14. The system of claim 11, wherein the one or more processing units are further configured to execute a trusted plugin associated with a second application configured to:
receive the output data; and
process the output data to render graphics for the application.

15. The system of claim 11, wherein the one or more processing units are configured to execute a plugin associated with a second application that implements the validator.

16. The system of claim 11, wherein the one or more processing units are configured to execute a plugin associated with a second application that is configured to provide the secure runtime environment.

17. The system of claim 11, wherein the native code module comprises binary code that runs directly on hardware in the computing system.

18. The system of claim 17, wherein the binary code in the native code module uses low-level libraries and application programming interfaces (API) that are available for use by native code modules in the computing system.

19. A non-transitory computer-readable storage medium storing instructions that when executed by a computer cause the computer to perform a method comprising:
receiving, by a computing system and from a remote system, a native code module for an application;
loading the application on software on the computing system;
validating, by the computing system, the native code module as being safe to be loaded and executed within a secure runtime environment of the computing system;
moderating, by the secure runtime environment, which system resources of the computing system can be accessed by the native code module and how the system resources are accessed; and
while executing the native code module within the secure runtime environment:
  (a) providing input data associated with the application to the native code module by retrieving, by the secure runtime environment on behalf of the native code module, the input data from a first buffer;
  (b) processing, by the native code module, the input data to obtain output data based on a result of performing a series of mathematical calculations using the input data; and
  (c) providing to one or more external components including at least one of a web application or a trusted plugin associated with the web application, the output data using a second buffer different from the first buffer to perform tasks in the web application.

20. The method of claim 1, wherein validating, by the computing system, the native code module prior to loading the native code module into a secure runtime environment of the computing system comprises analyzing, by the computing system, instructions included in the native code module.

21. The method of claim 20, wherein analyzing, by the computing system, the instructions included in the native code module comprises validating, by the computing system, the native code module to ensure that unsafe instructions are not include in the native code module.

* * * * *